US008732271B1

(12) United States Patent
Burns et al.

(10) Patent No.: US 8,732,271 B1
(45) Date of Patent: May 20, 2014

(54) SPONSORED MESSAGE NETWORK BASED ON COMMUNITY PREFERENCES

(71) Applicants: Christopher Burns, Ipswich, MA (US); John Woolley, Gulf Stream, FL (US)

(72) Inventors: Christopher Burns, Ipswich, MA (US); John Woolley, Gulf Stream, FL (US)

( * ) Notice: Subject to any disclaimer, the term of this patent is extended or adjusted under 35 U.S.C. 154(b) by 0 days.

(21) Appl. No.: 13/705,838

(22) Filed: Dec. 5, 2012

(51) Int. Cl.
*G06F 15/16* (2006.01)
*G06Q 30/00* (2012.01)
*G06Q 30/02* (2012.01)
*H04L 29/08* (2006.01)

(52) U.S. Cl.
CPC ............ *G06Q 30/00* (2013.01); *G06Q 30/0251* (2013.01); *H04L 67/22* (2013.01)
USPC .......................................................... 709/217

(58) Field of Classification Search
CPC .............. G06Q 30/02; G06Q 30/0241; G06Q 30/0245; G06Q 30/0246; G06Q 30/0251; G06Q 30/0255; G06Q 30/0263; H04L 67/22
USPC .......................................................... 709/217
See application file for complete search history.

(56) References Cited

U.S. PATENT DOCUMENTS

| | | | |
|---|---|---|---|
| 8,423,405 B1 * | 4/2013 | Gopalratnam et al. ....... | 705/14.4 |
| 2002/0082923 A1 * | 6/2002 | Merriman et al. .............. | 705/14 |
| 2003/0149937 A1 * | 8/2003 | McElfresh et al. ........... | 715/517 |
| 2005/0251444 A1 * | 11/2005 | Varian et al. ..................... | 705/14 |
| 2008/0082416 A1 * | 4/2008 | Kotas et al. ..................... | 705/14 |
| 2010/0042421 A1 * | 2/2010 | Bai et al. ........................... | 705/1 |
| 2013/0066719 A1 * | 3/2013 | Kast et al. .................. | 705/14.53 |

* cited by examiner

*Primary Examiner* — John MacIlwinen (57) ABSTRACT

The invention described here is a system and method for efficiently presenting sponsored messages to the user of a participating information site or service, based on the level of interest recently expressed in those messages by other visitors to the same site. Presentation of sponsored messages may also be based on the level of interest expressed by other visitors across the network who are in the individual user's geographic region.

9 Claims, 7 Drawing Sheets

SPONSORED MESSAGE NETWORK BASED ON COMMUNITY PREFERENCES

CROSS REFERENCE TO RELATED APPLICATIONS

This application claims the benefit of PPA Application Ser. No. 61/688,301 filed by the present inventors on May 11, 2012, titled "Social Shopping System"

FEDERALLY SPONSORED RESEARCH

Not Applicable

SEQUENCE LISTING OR PROGRAM

Not Applicable

BACKGROUND OF THE INVENTION

Prior Art

This invention relates to the process of efficiently selecting sponsored messages to present to online audiences likely to be interested in a particular product, service or topic.

A. Different Basis for Matching Sponsored Messages:

Advertising supported media compete for revenue by bringing sponsored content to potential buyers who are likely to be interested. The present methods for choosing which messages to present to which users are based on several different criteria, but the invention described here is different in each case:

1. General Advertising:

Most advertising systems allow the advertiser or the publisher to determine which sponsored messages to show the audience based on the demographic character and behavior patterns of that audience segment and the price the publisher charges to reach it.

But in the invention described here, the sponsor of the content has no control over where the content will be presented. The invention described here determines where and how often to present the content to an individual user based solely on the interest expressed in these messages by the community of other users who have recently visited the same page. Users determine which messages will be presented to other users.

US Patent 20120109739: Article and Advertisement Correlation in Online Advertising, Gupta, et al.

The system determines the likely readership level of articles on a web page, and the likely response to advertisements that might be presented on the same page. Then it looks for high correlations between frequently selected articles and frequently selected advertisements so that sponsors can place ads next to content that will increase the readership of both.

US Patent 20090070204: Targeted In-Group Advertising, Clancy, et al., (2009)

The system enables the sponsor to present relevant advertisements to targeted groups, based on the stated nature of the group and the interests of its members. Advertisers choose which groups to include from a defined set of groups.

2. Matching Messages Based on Search:

Some systems present sponsored messages to the user based on a search request from the user, on information the user enters on the page, or on other actions the user may take on the site being visited.

But the invention described here presents sponsored messages based entirely on the interest expressed in those messages by other users who have recently visited that site in recent days, not on searches or any other information retrieval the individual user may do.

US Patent 20050027821: System and Methods for Direct Targeted Media Advertising Over Peer-to-Peer Networks, Alexander, et al. (2005)

Users who initiate a search on a website receive advertising as well. Every answer to a search request calls related advertising to the same screen, according to the interest group the advertiser is seeking to reach and the price he is willing to pay.

US Patent 20110099076: System and Methods for Managing Online Advertisements, Repas, (2011)

In response to a search request, the system presents the user with related advertisements. The ads may be ranked according to price, relevance, or other criteria, and the user is able to select those of interest.

US Patent 20090171763: System and Methods for Online Advertising Driven by Predicting User Interest, Dong et al (2009)

The System predicts the potential interest in sponsored content based on the user's previous selection activity, and by the activities of similar users who have indicated interest in similar content.

3. Matching Messages Based on Previous Activity:

Some systems present sponsored messages to the user based on the user's personal profile, preferences, or previous activity.

But the invention described here does not analyze or record an individual user's activity on the participating site or service. It does not attempt to infer interest from behavior or compare user activity to any predetermined set of indicative behaviors, and it does not participate directly in ecommerce of any kind. The invention relies on the principle that people who go to the same information source have similar interests, and that regular visitors to a site or service will value information about products, services, and topics that other visitors to that site or service have found interesting.

US Patent 20100070335: Method and System for Targeting Online Ads Using Social Neighborhoods of a Social Network, Parekh et al, (2010)

The system predicts the potential interest in sponsored content based on the user's personal demographics and historical purchasing activity, as well as on the size, nature and activity of the person's social network.

US Patent 20090006188: Associating an Activity with an Online Advertisement, Guo, et al., (2009)

The system tracks the user's online activity for the purpose of presenting relevant advertisements, coupons and promotional material.

US Patent 20090112690: System and Method for Online Advertising Optimized by User Segmentation, Brady, et al. (2009)

The systems selects and sequences ads in an auction system, according to the nature of the ad and the profile of the user. It depends on assigning each new user to a demographic or interest segment according to personal information and online activity, and then it matches each ad to the segment that is deemed most appropriate.

4. Matching Messages Based on Page Content:

Some systems attempt to match advertisements to the user's interest by determining the content of the page the user is viewing. These systems look for keywords on the page, examine metadata, or look at a profile of the site.

But the invention described here does not examine the content of any page on which its sponsored messages appear, and makes no effort to determine what the individual user is reading at the time. The sponsored messages are selected for presentation based entirely on whether other visitors to that page have indicated interest in those messages in the recent past.

US Patent 20090313127: System and Method for Using Contextual Sections of Web Page Content for Serving Advertisements in Online Advertising, Chaikem, et al., (2009)

The system presents advertisements selected to match the content of the page the user is looking at. The system attempts to determine the content of the page by searching for keywords and metadata.

U.S. Pat. No. 8,041,601: System and Method for Automatically Targeting Web-Based Advertisements, Fikes, et al. (2011)

Advertisements are tagged to reflect the product or service they describe, and then scored according to the match between the advertisement and the content of the current page.

5. Matching Messages Based on Social Networks:

Some systems seek to match sponsored content to the content of social networks, where the items posted and the discussions that follow are mined for keywords that might indicate the user's interest.

But the invention described here does not collect personal information about users; it does not track online behavior or categorize users by demography, interest, or any other classification system. It does not connect users together in a social network, and is unaware of any social network to which the individual user may belong. It does not collect or present endorsements, comments or data about previous purchases by others. Any interactive site or service can be a partner, whether public or private, subscription or not, on any device, in any language.

Historically a web page, a mobile app, or an interactive information service has not been described as a "social network" simply because many people—even many similar people—visit it on a regular basis. A social network requires that members be registered, that a minimum of personal information be gathered about each member, and that participants have a way to communicate with each other through the network itself. The invention described here does none of these things. Visitors to participating sites are entirely anonymous; their individual behavior is never recorded; and the system provides no way for one user to be in contact with another user of the same site or service.

US Patent 20100057546: System and Method for Online Advertising Using Social Information, Wang, et al., (2010)

The system classifies the user according to personal profile, social network membership and online activity. Advertisements previously selected by other members of the same social network are sent to the new user.

US Patent 20100211464: Targeted Online Advertising, Zhu, et al. (2010)

A user is characterized and classified by the system according to personal profile and online activity, and then the system presents that user with advertisements that have been popular among similarly classified users.

US Patent 20120010939: Social Network Based Online Advertising, Krishnamoorty, et al., 2012

The system recommends products and services to a user based on the purchases, reviews and comments of others in the user's social network. The act of one user purchasing or reviewing a product causes an advertisement or endorsement to be automatically created and sent to friends, associates and others in the user's social network.

U.S. Pat. No. 8,095,432: Recommendation Engine for Social Networks, Berman et al, (2012)

The system recommends products and services to a user based on the purchases and recommendations of others in the user's social network, ranking those recommendations according to the closeness of the other user. Recommendations based on the actions of friends are ranked higher than those of non-friends or others.

US Patent 20110218850: Scientific Targeting for Advertisement and Content Selection, Distribution, and Creation, Kaufman et al, (2011)

The system creates a "scientific" segmentation of the audience based on individual characteristics and past activity, assigns each new visitor to the appropriate segment, and then selects or tailors advertisements for that individual based on past response to that advertisement from others in the same segment.

US Patent 20090171748: Using Product and Social Network Data to Improve Online Advertising, Ave, et al. (2009)

Users are categorized according to personal information, social network activity, and online behavior. Advertisements are similarly categorized according to the audience group the merchant intends to reach, and ads are sent to matching users through various channels, and at various times in the product's life cycle.

US Patent 20120084160: Providing Social Endorsements with Online Advertising, Badros, et al. (2012)

The system tags each advertisement to reflect the product or service described, retrieves the social network data about the user who has requested this ad, and then retrieves from the user's social network any instances where another member of the network has purchased, endorsed, or commented on that product.

US Patent 20110041168: Systems and Methods for Targeting Online Advertisements Using Data Derived from Social Networks, Murray, et al., (2011)

The system registers users into a social network, requiring personal information and tracking online behavior. Advertisements are then sent to the social network member, based on the target goals of the advertiser.

US Patent 20110153413: Method and System for Intelligent Targeting of Advertisements, Chunilal (2011)

The system classifies users according to personal profile and social network activities, and then directs advertisements to those users the advertiser wishes to reach.

6. Matching Messages Based on the Purchases of Others:

Some ecommerce systems and social networks suggest new products to users based on purchases by other members of the same network who have looked at the same item. In other cases, the purchase of an item by one user in a social network is advertised to other users in the same social network as a form of endorsement.

But both methods are based on the past purchase of specific products, not on the viewing behavior of others who have visited the site the user is on. And both depend on the user being a recorded member of a purchasing group or social network. The invention described here does not record or recognize the identity of any user, or the existence of any group or network to which that user may belong.

7. Matching Messages Based on Popularity:

In matching sponsored messages to target audiences, many systems suggest products to the user that have been frequently chosen by other users of that system. But the audience formed by such systems is often very large, and the value of such an indicator for an individual user is relatively low. A book that is of great interest to the small community of Jane Austen readers, for example, might not be "popular" on the Amazon.com site, while an Amazon best seller by a famous world leader might be of little potential interest among visitors to Jane Austen.com. In choosing books about Jane Austen, Jane Austen readers place the highest value on recommendations by other Jane Austen readers. On the continuum from large general indicators of interest like best seller lists and most frequently emailed stories, to narrow indicators of popularity that track the potential interest of a specific message among members of a specific group, the historically high utility of advertising with special interest magazines, talk radio, and niche television channels suggest that the value of matching sponsored messages to interested audiences rises as the size of the group grows smaller and more homogeneous.

US Patent 20100042421: Context Based Advertisement Bidding Mechanism, Bai et al, (2010)

The system describes a process for pricing and selling advertising for mobile device users based on one or more of a wide range of device and user characteristics including "advertisement effectiveness" which measures "user feedback" associated with each advertisement (Claim 7). Measuring response to different versions of an advertisement in order to tailor the message to the targeted market segment has long been a standard part of good marketing campaigns.

The system tracks advertising effectiveness among segments of the audience, but the specification and drawings do not show that the system tells members of a group which ads received a disproportionately positive response from other members of that group. The system measures "ad effectiveness" in order to make the ad better at influencing the target audience. But the system does not report "ad effectiveness" back to the user, so the value of peer response and recommendation by others within the group is lost.

Compared to this system, the invention described here has the novel and distinguishing characteristic that it measures both views and clicks for each sponsored message by the members of every group in the network separately, and then selects and ranks the ads presented to each group to give highest priority to those which engendered the greatest positive response among members of that group. Thus it is able to capture and present to the user the judgment of other members who share a common interest, and it provides those high responses in the form of valuable peer endorsement.

The invention described here is not only novel and distinctive, it is counter-intuitive. Calculating the popularity of each message within each group in the network is exponentially more demanding of computational resources. Tracking the popularity of 250,000 messages on a single interactive service requires a database of 250,000 records. But tracking the popularity of 250,000 items across 1000 different and independent interactive services served by the network requires a database of 250,000,000 records. It is not obvious that such an enormous increase in system requirements would be justified merely to tailor the advertising effectiveness of a message to every different group.

Moreover, the invention described here takes control of placement and presentation of sponsored messages away from the message sponsor who is guessing the user's interests based on personal information, and instead lets users within a spontaneous, anonymous, and self-organizing group determine which messages will be shown and which will not. This is not likely to be seen as an obvious improvement by those who sponsor such messages.

But the invention described here uniquely increases the authority and appeal of each selected message by ranking messages according to their appeal to other members of a group, and presenting that ranking to each member as a form of peer endorsement.

Additionally, the invention described here allows the user to see new sponsored messages in his or her areas of interest by anonymously visiting an interactive service where users with similar interests select messages of high appeal. It avoids requiring the user to provide—or permitting the system to extract—the detailed personal information on which so many advertising systems increasingly depend.

B. Different Network of Distinctive Audiences

The Invention described here differs from all other sponsored information systems in the way it matches messages to relevant users. But it differs in a second way as well: it is not one site but a network of hundreds of independent information sites and services making recommendations to very different audiences, all drawing from a common catalog of sponsored materials. Some services present the visitor with a list of the most frequently viewed stories, images, or products from their own database. Ad networks populate participating sites with ads from a common catalog, based on the content of the message and nature of the page being viewed. But the invention described here combines the popularity-based selection criteria with a network delivery system in a manner that is novel and not obvious, creating new advantages for both advertisers and viewers:

1. Scale and Segmentation for the Sponsor:

By combining hundreds of information sites and services into a virtual "audience", the invention described here creates a market large enough to be meaningfully segmented by ZIP Code or other geographic region. There are so many information services currently dividing up the market that no one of them can reach enough of the community to give the local advertiser an efficient buy. Only a network that combines multiple services into a single large audience can offer meaningful market penetration at the ZIP code or neighborhood level.

The invention described here creates that network by introducing a distinctive icon, displayed on all participating services, that will call to the screen the sponsored messages which engendered the greatest interest among other visitors to that site.

The invention creates a common Presentation Window, familiar to users of all participating sites, which selects and organizes materials to suit the individual user's preferences.

And the invention creates a common information management system enabling sponsors large and small to place their messages in the catalog, choose the market they are trying to reach, and track the performance of the message in real time. The system combines the benefits of scale with the precision reach of very distinctive interest groups.

2. Diversity, Relevance, and Timeliness for the Viewer:

Diversity: The invention described here matches messages to the individual user based on the interests of the community of others who have used the information service he or she is visiting, so the messages are more diverse than the individual user's interest, alone, might suggest. The system awakens new interests; it alerts the user to new opportunities based on the judgment of others instead of tracking a personal interest that may have faded.

Relevance: Because it presents messages only to those users in the sponsor's chosen geographic area, the messages are more relevant. In the case of mobile devices, this is particularly valuable. In the flood of information that arrives on the smart phone or tablet, the invention described here offers the sponsor the option of reaching only those users in a particular neighborhood. The sponsor does not pay for audience that is not in his selected market, and the user is not overloaded with messages that are not relevant.

Timeliness: In virtually all advertising supported systems it is the advertiser who chooses where and when his message should appear, but in the invention described here it is the community of recent users who decide, based on whether the sponsored message is interesting or not. Sponsored messages are ranked according to how many users of that service chose to see more information about each message in the last few days. So from day to day, from hour to hour, the messages appearing in the Presentation Window are those which are of greatest interest to the group which has formed around that service. Such indication of interest among peers has historically been a major element in any purchase decision.

BACKGROUND OF INVENTION

Objects and Advantages

Many of the online advertising systems in use today attempt to match advertisements and other sponsored messages to potential buyers based on the past purchases, network memberships and sites visited by those buyers. But this collecting of personal data is increasingly viewed as intrusive and risky for the user. The traditional method has a second disadvantage, as well: a potential buyer's past interests do not always indicate future interests. The desire to know about a product is greatly lessened once the product is purchased, and users complain that when ads for the product continue to be presented—especially as the users move from service to service—it makes them feel they are being "followed". The invention described here does not collect or keep any personal information, relying entirely on what other recent users of that service have found interesting.

Most advertising systems try to anticipate the interest of an audience member by analyzing the member's demographics and personal information, but that does not take into account the fact that interests change based on news, promotion, and the dynamics of group discussion. By contrast, the invention described here reflects the constantly changing interests of recent visitors to a particular site. Attractive new products, services, or topics in the day's news, special pricing for a limited time, and the shifting judgment of the group all cause different sponsored messages to receive a higher level of attention, and therefore to be presented to the individual user. The invention described here is dynamic, presenting messages that are relevant to members of that group at that moment.

Most systems for matching sponsored messages to potential buyers are confined to a single information service—a newspaper, magazine, television show, web site or mobile app. The audience reached by a sponsored message is never larger than what that service alone can gather. As the number of these services increases, the audience for each decreases, and the sponsor has to buy multiple audiences to reach the intended market. This is possible for national sponsors, but very difficult for small and local sponsors. For them, no single service can reach a sufficient number of households in a single community, so very few small and local advertisers are able to advertise efficiently on the Internet today. But the invention described here consists of a network of services, zoned by ZIP code or other geographic region, all drawing on a central catalog of sponsored messages. Thus even a small advertiser pays only for the audience in his target area, and has his message delivered on dozens, even hundreds of services that together achieve a sufficient penetration of the intended market.

SUMMARY

The invention described here is a method for efficiently presenting sponsored messages to the user of a participating site or service, based on the level of interest expressed in those messages by the community of other visitors to the same site in recent days, as indicated by the number of times those visitors have clicked on the message or otherwise requested additional information. Presentation of sponsored messages may also be based on the level of interest expressed by other visitors across the network who live in the individual user's geographic region. Because the network links many sites and services into a single virtual audience, it can be segmented geographically down to the ZIP code and neighborhood level and still deliver an acceptable penetration of the market for small and specialized merchants.

Sponsored messages may include advertisements for products and services, coupons and promotional offers, announcements, press releases, news articles, music, books, movie trailers, and other elements in text, image, video, data and interactive formats. The invention described here is designed for interactive display devices including desktop, laptop, and handheld computers, smart phones, tablets, game controllers and other personal digital appliances, as well as interactive home media.

DETAILED DESCRIPTION

A. Overview

Figure 1:
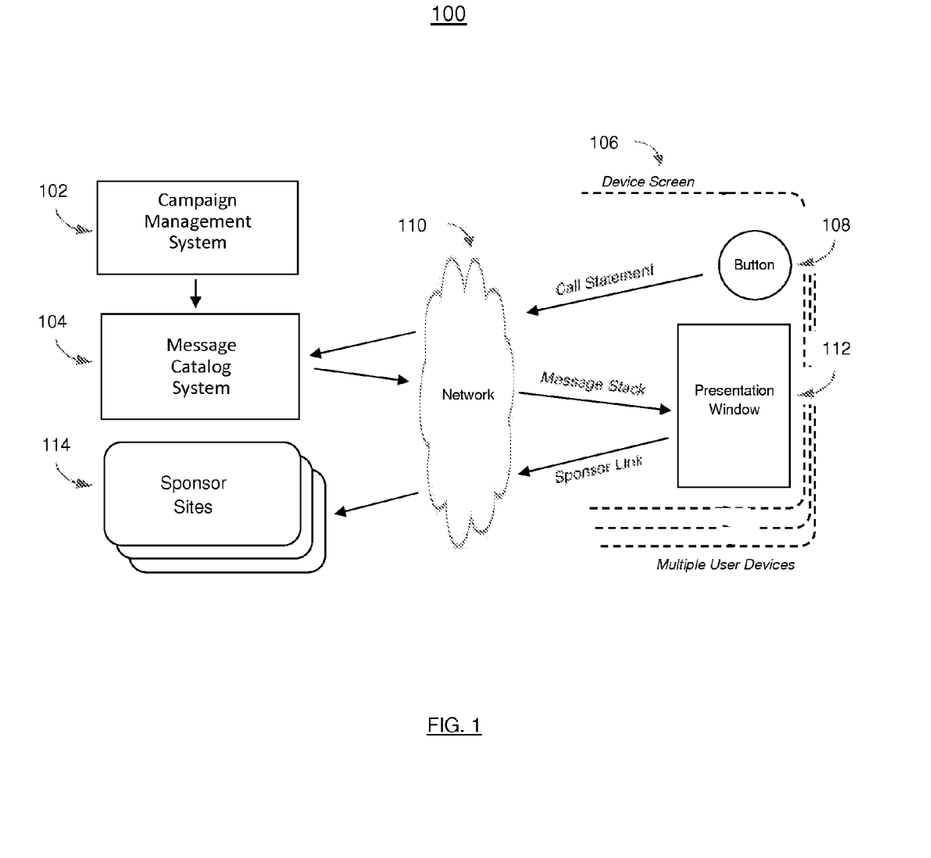
FIG. 1 is an overview of the system according to one embodiment of the invention.

FIG. 1 is a distributed computer system 100 according to one embodiment of the invention. The system includes interactive user devices 106 such as, but not limited to, computers, telephones, and interactive video displays. When connected to a participating information site or service, the user device displays a distinctive button 108 which, when selected, calls sponsored messages from the Message Catalog System 104 over the Internet or a similar interactive network. The invention includes a Message Catalog 104 in which sponsored messages are stored and from which they are distributed. The invention includes a Presentation Window 112 displayed on the screen of the participating information service, and it includes Sponsor Sites 114 to which the user may be directed. Although the internet is depicted as the connecting network, the invention contemplates additional embodiments in which the connection may be one or more wireless networks, WANs, LANs, telephone, cell phone, interactive video or other data networks. The invention further contemplates embodiments in which user devices may be or could include wireless, portable, or hand held devices such as cell phones, smart phones, tablets, PDAs, portable game controllers, etc.

Each of the one or more computers 102, 104, 114 may be distributed, and can include various hardware, software, applications, algorithms, programs and tools. Depicted computers may also include a hard drive, monitor, keyboard, pointing or selecting device, etc. The computers may operate using a general purpose operating system such as Microsoft Windows or Apple OS X, etc. Each computer may include a central processing unit (CPU), data storage device, and various amounts of memory including RAM and ROM. Depicted computers may also include various programs, applications, algorithms and software to enable keyword searching as well as browsing.

From any computer or interactive information device with access to the network, any authorized sponsor may sign into the Campaign Management System 102, upload a message, establish the schedule, select the target audience, and approve the budget. Elsewhere across the Internet, when a user visits a participating information service 106 the screen displays a distinctive button 108 indicating that sponsored messages are available. When the user selects the button, a request is sent over the Network 110 to the Message Catalog System 104 which retrieves the messages intended for that user's geographic area and sends them to the Presentation Window 112 which opens on the user's device. The Presentation Window allows the user to see the messages ranked by popularity among recent visitors to that site, by popularity among users in that neighborhood, by how recently the message has become available, and by the value of any discount, coupon, or promotional pricing being offered. When the user selects any sponsored message in the Presentation Window 112, he is connected to the relevant Sponsor Site 114 where additional information is provided about the product, service, or article described in the message. The Message Catalog System records every time a user selects any sponsored message, noting the site the user is visiting, the visitor's geographic location, and the date and time of the selection.

The Campaign Management System 102 and the Message Catalog System 104 are intended to broadly include all programming, applications, algorithms, software and other tools necessary to implement or facilitate methods and systems according to embodiments of the invention. The elements of the two systems may exist on a single server computer or be distributed among multiple computers or devices.

B. Creating a Sponsored Message

Figure 2:
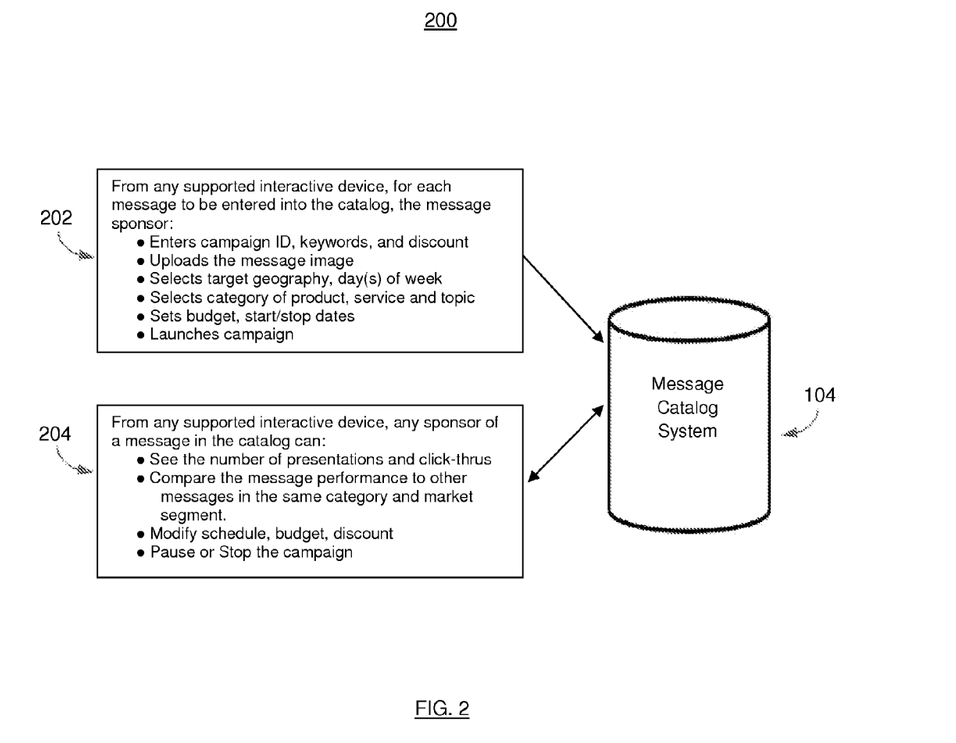
FIG. 2 illustrates the functions of the Message Catalog System, according to one embodiment of the invention.

FIG. 2 illustrates a method 200 for creating a sponsored message according to one embodiment of the invention. In step 202, from an interactive device with access to the network, any authorized sponsor can create a message, set the parameters of a campaign, and place the message in the central Message Catalog System 104 from which all participating information services will draw. In this embodiment, the sponsor may:

Create a Message ID and upload an image in the defined type or types,

Select the geographic region (neighborhood, ZIP Code, Metro Area, Region, Country) in which the message is to be displayed, Assign a category to the product, service or topic of the message from a proprietary taxonomy of products, services, and topics, such that a user can browse all messages by category and subject, Set the dates on which the campaign should start and stop, as well as the days of the week and day parts (morning, afternoon, evening, night) when the message should be displayed, Enter keywords that describe the content of the message, and enter the value of the discount, coupon, or promotional offer.

Once the sponsored message is stored in the Message Catalog System 206 the sponsor may access the catalog from any interactive device connected to the network 204 and review or change the status of the campaign. The Message Catalog System reports the number of times the message has been selected by users, by time, by geographic area, by participating information service, and by other parameters. The sponsor may compare the click-to-view ratio of his message to the performance of other messages in the same product category, in the same geographic area, and being offered at the same or similar discount value. The sponsor may modify the campaign to increase or reduce the budget, change the discount value, change the image associated with the campaign, and change the message schedule. Finally, the sponsor can pause, stop, restart, and cancel the campaign online at any time.

Using one or more computers, the Message Catalog System 206 maintains a proprietary and confidential database of information about each sponsored message, including for each message the number of times it has been viewed and selected by visitors to each of the participating information services. It also calculates the number of times any sponsored message has been selected by users in each of the known geographic areas, as well as the date and time of the selection. This data and the proprietary analytics that support it allow the Catalog Management System to determine on demand the messages most frequently selected, over time, on any participating information service, or in any known geographic area.

C. Retrieving Sponsored Messages

Figure 3:
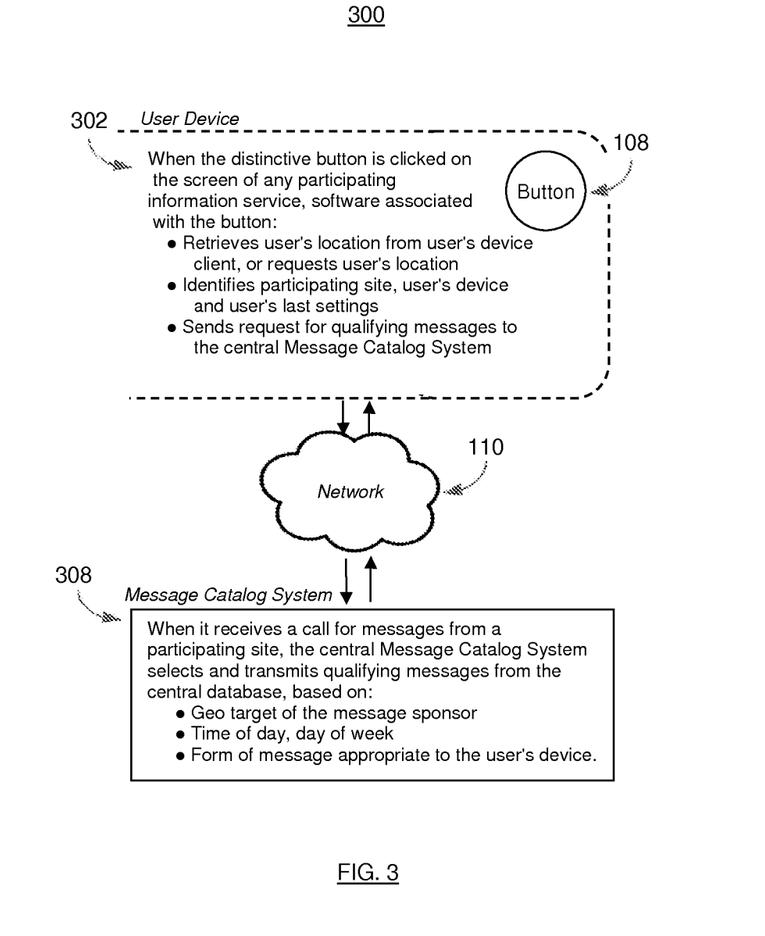
FIG. 3. illustrates the functions of the call button, according to one embodiment of the invention.

FIG. 3. illustrates a method 300 of interacting between the user's device and the central Message Catalog System. In this embodiment, the process of retrieving one or more sponsored messages from the Message Catalog System 308 to the User Device 302 begins when a visitor to any participating information service selects the distinctive button 108 which all participating service have agreed to present on their screen. The software associated with the selected button sends a call over the network 110 to retrieve the messages. The call sent to the Message Catalog System 308 is in the standard HTTP call format and includes the identity and location of the participating site or service, section or online page. The software associated with the button also determines what type of device is being used, and retrieves the user's last preferences and views from data stored in the user's client system, if available.

In cases where the device being used has the ability to determine the location of the user at any time, the call includes that location. In cases where the location of the user cannot automatically be determined, the software associated with the distinctive button retrieves the ZIP code from the user's browser, or from a file previously placed on the user's system (usually called a "cookie"). If the ZIP code cannot be determined by the system, the user is asked to provide it.

The call message is transmitted over the network 306 to the Message Catalog System, beginning the process of message retrieval. Through a process described in more detail below, messages are chosen from one or more active messages in the catalog based on the geographic location of the user, the time and day of the week, and the message type required by the device being used. Each message includes the network address to which the sponsor wishes to direct the interested visitor (commonly referred to as the "link").

D. Detailed Functions of the Message Catalog System

Figure 4:
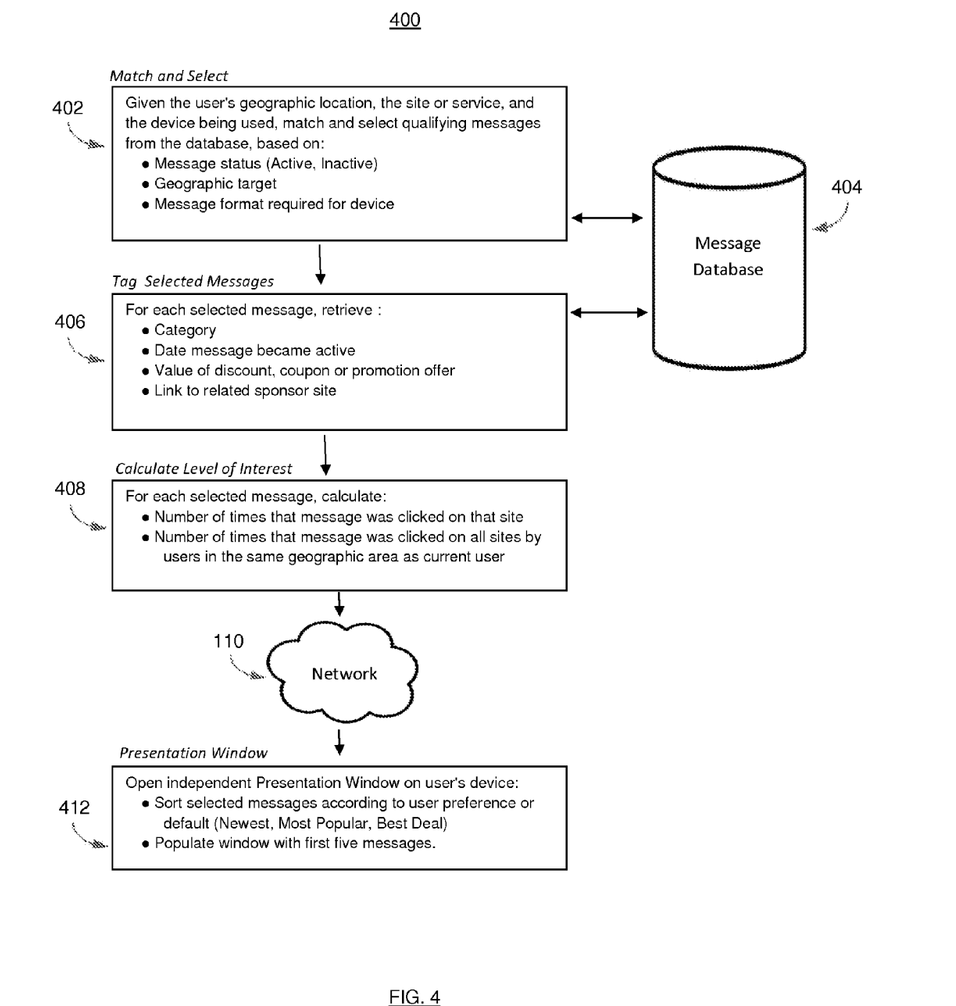
FIG. 4. illustrates in more detail the basic functions of the central Message Catalog System.

FIG. 4. illustrates in more detail 400 the functions of the Message Catalog System as it retrieves the sponsored messages and sends them to the user. In the first step, 402 the Message Control System receives from the user's device a call for messages. The call includes (a) the site or service which the user is currently visiting, (b) the type of device being used (computer, tablet, smart phone, game controller, interactive video), (c) the user's current geographic location, and (d) the message ranking preference last selected by the user (Newest, Most Popular, Best Deals). The ranking preference information is retrieved from a file on the user's system, (a "cookie") created the last time the user made a selection on the presentation window. If the preference file is not available, the system defaults to pre-set preferences.

With these parameters, the Message Control System uses one of a plurality of commercial database management systems to access a database of messages 404 and retrieve those that match the user's request.

In the second step, 406 the Message Catalog System retrieves for each selected message the category of the message, the date and time the message last became active, the value of the discount, coupon, or promotion offer as a percent of the retail price, and the link to the associated sponsor site.

In the third step, 408 the Message Catalog System calculates for each message the number of times that message has been recently clicked on or otherwise selected by other visitors to that site. It also calculates the number of times that message has been recently clicked on or otherwise selected by other visitors in the user's current geographic area. This calculation is based on a record of all actions taken on all sponsored messages in the catalog by all visitors on all participating sites. The results of these calculations are ranked to fit the user's request, by popularity among visitors to the site, by popularity among others in the same geographic area, by value of the discount or by the newness of the message, and then some or all of these messages are sent to the user's system. The number of messages sent, cached, or kept on the central system may range from a few to a few hundred, variable by site, by the capacity of the user's device, and by the speed of the network, in order to present the user with the highest ranking messages in the shortest time.

In the final step 412 the Message Catalog System opens an independent Presentation Window on the user's device and populates the window with the first five messages selected and ranked according to the criteria and preferences of the user. The user can see the messages five at a time, and page forward and backward through the list.

E. Displaying Sponsored Messages

Figure 5:
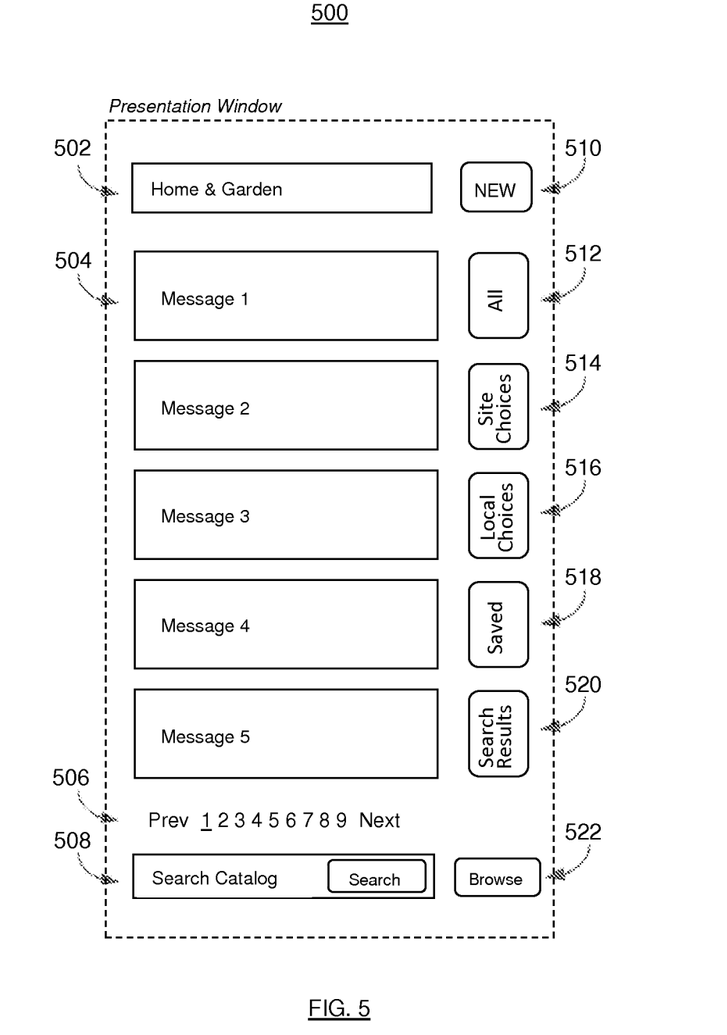
FIG. 5. illustrates the functions of the Presentation Window, according to one embodiment of the invention.

FIG. 5 illustrates the functions of the Presentation Window 500, as experienced by the visitor when a stack of one or more sponsored messages is received from the Message Catalog System. In the nominal embodiment of the invention, on a computer screen, a smart phone, a game controller system or other interactive device, the method of the invention presents the first block of sponsored messages, as well as selection devices (nominally called "buttons") which allow the visitor to select, rank, page through, save and search the results.

In the nominal embodiment of the invention, a selection device is presented on the screen 502 that allows the user to select which general category of messages he or she wishes to see, including, for example, such categories as Home & Garden, Clothing & Gifts, Electronics, Food & Travel, Health & Sports, Money & Career, and All Categories.

A second selection device 510 allows the user to rank the sponsored messages by date of publication (Newest), by popularity among recent visitors (Most Popular), or by the value of the discount, coupon, or promotional offer (Best Deal).

Three selection devices 512, 514, 516 allow the user to further select particular sponsored messages. In the nominal embodiment of this invention, one selection device 512 (All) allows the user to see all sponsored messages available to that geography, within the selected category, and ranked by popularity, newness or discount value, depending on how the ranking selector 510 has been set. A second selection device 514 (Site Choices) allows the user to see all the messages in the selected category that have been recently selected by other visitors to this site. A third selection device 516 (Local Choices) allows the user to see all the messages within the selected category that have been selected by visitors to all the network sites from the user's geographic area, such as Metro Area, ZIP Code, or neighborhood. The results of combining these selectors can be seen in the table below.

| Selectors | Ranking | | |
| --- | --- | --- | --- |
| | Newest | Most Popular | Best Deals |
| All | All messages in the chosen category, ranked by newness | All messages in the chosen category, ranked by popularity among users of the system on all sites | All messages in the chosen category, ranked by the value of the discount or coupon offer. |
| Site Choices | Messages in the chosen category that have been selected by other visitors to this site, ranked by newness | Messages in the chosen category that have been selected by other visitors to this site, ranked by popularity | Messages in the chosen category that have been selected by other visitors to this site, ranked by the value of the discount or coupon offer |
| Local Choices | Messages in the chosen category that have been selected by other visitors from the user's geographic rarea, anked by newness | Messages in the chosen category that have been selected by other visitors from the user's geographic area, ranked by popularity | Messages in the chosen category that have been selected by other visitors from the user's geographic area, ranked by the value of the discount or coupon offer |

In other embodiments of the invention, the interaction and relationship of selection devices may be arranged differently in order to give the user access to the messages in ways more optimal to that device or embodiment.

When the user changes the ranking method by selecting one of the several choices, the central server re-ranks the results of the message calculations and sends the new sequence of messages back to the user's system. In some embodiments, depending on the capacity and processing power of the user's device, the ranking may be done on the user's system, not on the central server, in order to balance the computational load on the overall system.

In the nominal embodiment of the invention, the sponsored messages are presented in blocks of five messages at a time. The user can retrieve additional blocks of messages, or return to previous blocks of messages, by selecting "Next", "Prey", or the block number from a display of choices 506 at the bottom of the sponsored messages.

When the user selects an individual message 504, the system supporting the Presentation Window directs or otherwise links the user to the network site specified by the sponsor of that message. The Message Catalog System records this user selection as well as the date/time and geographic location of the user, and it associates that selection event with the message being selected, creating an ongoing history of message popularity by site and by location on which the ranking calculations (Site Choices 412, Local Choices 414) are based.

In the nominal embodiment, when the user selects any message with an alternate gesture such as a right click, he or she is offered the choice to save the message, print the message, email the message, or search the Message Catalog System for similar messages. Saved messages are displayed when the Saved selection mechanism 518 is selected. Similar messages, if found, are displayed when the Search Results selection mechanism 520 is selected.

The user may search the Message Catalog System by entering into the search window 508 any search term or phrase in conventional Boolean format. The Message Catalog System will search the message database for relevant messages using any of a plurality of commercial search tools and techniques known to those skilled in the art. This enables the user to search on product names, model numbers, topic phrases, product and service classifications and other relevant terms. The results of the search are displayed when the user selects the Search Results selection device 520.

The user may also browse all sponsored messages in the Message Catalog System by selecting the Browse selection mechanism 522. In the nominal embodiment of this invention, the user is then presented with a selection tree of categories and subcategories from which he or she may further select and choose product, service or topic groups by various characteristics in a manner familiar to all those skilled in the art.

Figure 6:
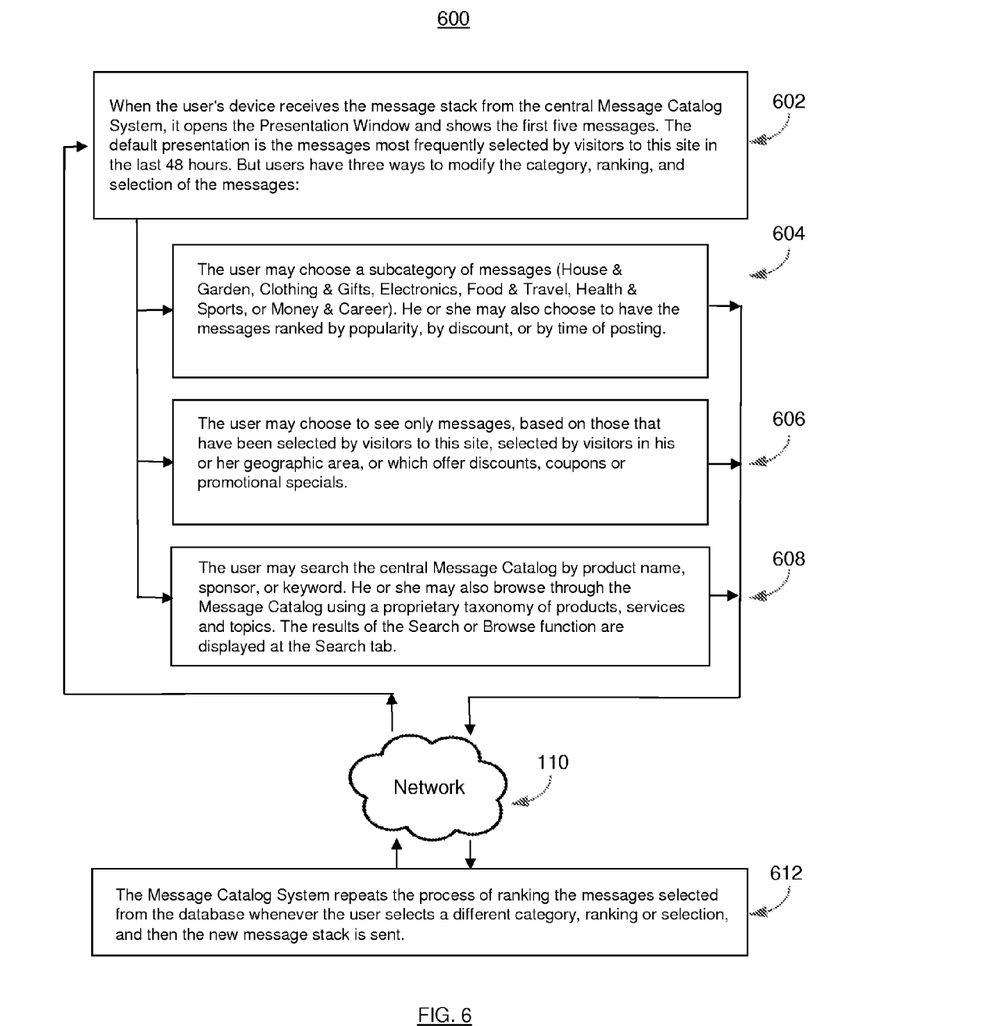
FIG. 6. illustrates in more detail the step-by-step flow of the Presentation Window.

FIG. 6 illustrates in more detail the process 600 of content selection and renewal. In the preferred embodiment, the Presentation Window is launched and controlled by the central Message Catalog System, not the site or service being visited by the user. In response to a request for sponsored messages, the window is opened and the first block of messages is displayed. When the user chooses a different category, or chooses a different rank sequence 604, the Message Catalog System repeats the ranking process 612 and refreshes the messages that have been sent to the user device. Similarly, when the user chooses to filter the messages differently 606 (Site Choices, Local Choices) the Message Catalog System re-ranks the results 612 and transmits the new message sequence over the network 110 to the user's device. This design ensures that the user always has at least five relevant messages to view, whichever category, ranking sequence or filter he has applied.

When the user chooses to search or browse the catalog 608, the Message Catalog System matches the active messages in the database to the new requirements and sends the new results over the network 610 to the Presentation Window on the user device.

F. Database Functions

Figure 7:
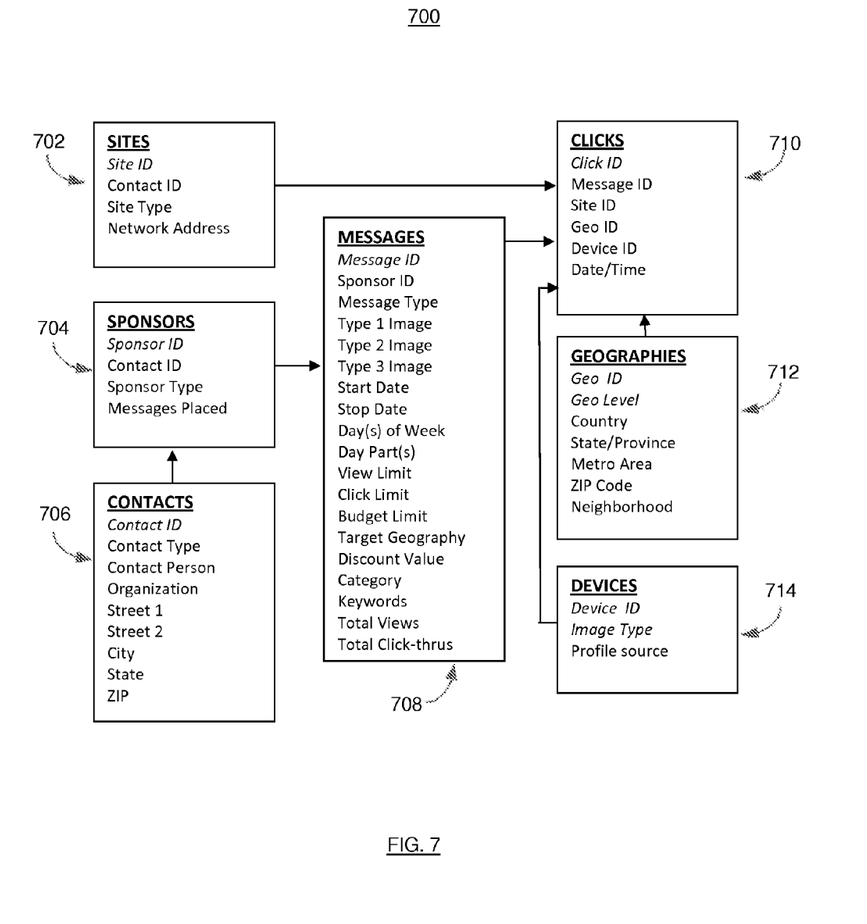
FIG. 7. illustrates the organization and interaction of the major database files that support the functions of the Message Catalog System.

FIG. 7 presents a simplified diagram of the database 700 on which the invention relies, describing the major files, and the records that constitute each file.

The Sites file 702 includes a record for each participating site, including a link to the contact information, the network address of the site and the site type (Web site, smart phone app, game controller, etc.). The Sites file is updated by the system administrator whenever a new site or service joins the system. A Site may be a publication, a section within the publication (sports, lifestyle, political, etc.) or even a column or blog within a section or portion of the service where a distinctive and coherent audience is formed.

The Sponsors file 704 includes a record for each authorized sponsor, including a link to the contact file, the type of sponsor (merchant, non-profit, commercial publisher, public service, blogger, etc.), and the total number of active messages placed by that sponsor. The Sponsors file is updated whenever a message sponsor opens, closes, or changes an account.

The Contacts file 706 includes a record for each Site and Sponsor contact participating in the system, including the conventional address fields, and the contact type (Site, Sponsor, Admin, etc.).

The Messages file 708 includes a record for each active and inactive message in the database. The Message file includes links to the Sponsor file. The Messages file also includes for each record the message type (image, text, audio, video, etc.), the alternate images appropriate for each device type, the dates on which the message should start and stop, as well as the days of the week and day parts (morning, afternoon, evening and night) in which the message should be presented. The Messages file includes for each message the campaign limits that should not be exceeded, including the number of times the message is viewed, the number of times it is selected, and the total cost of the campaign. The Messages file defines the geographic entities where the message should be displayed (Country, State, Metro Area, ZIP, etc.) and the value of the discount, coupon, or promotion being offered. The record also keeps a current count of the times the message has been viewed on all sites and selected on all sites. The Messages file is updated whenever a message is created, modified, or cancelled by the sponsor.

The Clicks file 710 includes a record for every time any visitor clicks on any message on any site. It is the primary activity file of the system, and is the basis for the calculations that determine how to select and rank the messages whenever a visitor opens or changes the Presentation Window. Each record in the file includes the Message ID, the Site ID where the click occurred, the Geo ID where the user is located, the Device ID describing the device being used, and the date/time of the selection.

The Geographies file 712 includes a record for every geographic entity referred to in the system, including countries, states, metro areas, ZIP codes and sub-ZIP code regions such as neighborhoods or rural villages. The Geographies file enables sponsors to select a state or metro area and automatically include all incorporated ZIP codes, or to specify a location and include all ZIP codes within 5, 10, 25 or 50 miles. It is updated by the system administrator whenever a new geographic entity is identified.

The Devices file 714 includes a record for each different type of device (browser, laptop, desktop, tablet, smart phone, game controller, interactive video) which may gain access to the system. The record includes size and resolution parameters for messages to be displayed on that device, and other data elements describing where the geographic location is found, if available. The Devices file is updated by the system administrator whenever a new device is identified.

G. Other Embodiments

While the nominal embodiment of the invention focuses on advertisements, coupons and promotional messages, other embodiments of the invention may deliver news, music, video, opinion, and articles to the community of interest. A system for presenting a user with ads that have attracted the attention of others who have similar interests is just as valuable for distributing news, tips, commentary, and entertainment. The traditional method for publishing such items has been to rely on the judgment of editors who try to anticipate the interests of their audience. How much more efficient it would be, then, to let the audience anticipate the interests of the audience; to allow groups with a common interest to tell each other in real time, across an infinite range of topics, what they as a community find most interesting at the moment.

While the nominal embodiment of the invention is envisioned as a way to deliver sponsored messages to web sites on the internet, the invention is also envisioned as a way to present sponsored information on other types of networks as well, such as game controllers participating in an interactive network. It is envisioned as a way to present advertising, marketing materials, movie trailers, program material and other information on interactive video systems where the user is watching a video program, a music video, or a movie. In such cases the call button 108 might be programmed to appear on the screen at a specific point in the program, such as during the credits, and the presentation window would open as an independent element on the same screen. The invention is also envisioned as a way to present coupons, marketing messages and other information on smart phone applications or ebook readers, where the call button 108 appears in the corner of the screen and the presentation window appears to fill some or all of the screen.

G. Conclusions and Ramifications

The invention described here is a method for delivering sponsored messages to individual users who are likely to be interested, based on the popularity of those messages among the community of others who have recently visited the same site, or among users in the same geographic area. By providing the user with a way to select and rank messages according to category, popularity, and deal value, the system allows the user to choose which messages to see rather than have that choice be made by advertisers. By presenting the messages most recently selected by others, the system provides a fresh and constantly changing view of the messages others with similar interests have found most appealing.

By networking hundreds of sites and services into a single virtual audience, addressable by ZIP code and even neighborhood, the system creates a way for even local and specialized advertisers to achieve a sufficient penetration of their target markets without waste. By providing a powerful, low cost advertising system to smaller, specialized and non-commercial sites and services, the system brings revenue to those services proportionate to the size and loyalty of their community, without requiring those services to maintain an advertising sales function or the system apparatus for managing the schedule and placement of the ads.

The invention described here does not collect personal information on any user. It does not track individual purchases or online searching; it does not mine the user's social network for the endorsements of others. The system does not attempt to guess what the user might be interested in by analyzing his or her personal profile, or by segmenting the audience into demographic groups based on geography, age or other personal characteristics. The system does not try to guess what the user's interests are by looking at the content of the page. It is a system in which the user gets the benefit of seeing messages that others in the same interest community, no matter how small, have decided were of value.

In the past, advertisements have been pushed on the user by merchants and editors who were trying to anticipate the interests of the audience by examining demography, behavior and the content of the page. But the invention described here is designed to let the user pull messages into view based on selections by others in the same interest group. Moreover, the user can rank and view those messages by popularity among other users, by popularity among others in the same geographic area, by newness, and by the value of the deal. It gives users access to the shopping judgment of their peers, and makes advertising a much more flexible, more relevant, and more valuable source of information.

What is claimed is:

1. A computer-implemented method by which a message catalog system selects and delivers to the user of a participating site or service one or more sponsored messages, explicitly ranked on said participating site or service according to the interest expressed in said sponsored messages solely among users of the same said participating site or service, comprising:
   (a) selecting said sponsored messages from a central catalog and transporting said sponsored messages over a network to one or more said participating sites or services, and
   (b) displaying said sponsored messages, explicitly ranked on each said participating site or service according to the number of times said users of the same said participating site or service have called for additional information from said sponsor of each said sponsored message, whereby said user of each said participating site or service is explicitly advised about said interest expressed in each said sponsored message solely among said users of the same said participating site or service, and said user is shown an indication of how said sponsored message ranking was derived.

2. The method of claim 1 wherein said participating sites or services are independent of said message catalog system.

3. The method of claim 1 wherein said network is the internet, a wireless network, a wide area network, a cellular telephone network, a cable television network, or an interactive satellite network, and said sites or services are displayed on a desktop computer, a notebook computer, a tablet, an ebook reader, a smart phone, a personal digital appliance, a game controller, an interactive video system, or a wearable interactive digital display device.

4. The method of claim 1 wherein said sponsored messages are advertisements for products and services, coupons, promotional offers, announcements, press releases, or marketing messages in text, image, audio, video, or data format.

5. The method of claim 1 wherein said sponsored messages are news items, movies, music, books, articles, stories, or segments thereof in text, image, audio, video, or data format.

6. The method of claim 1 wherein said ranking of said sponsored messages is based solely on the number of times said users of the same said participating site or service have called for additional information from said sponsor of each said sponsored message.

7. The method of claim 1 wherein said users of said participating sites or services are prospective consumers of said products, services and information described in said sponsored messages.

8. The method of claim 1 wherein said expression of interest is measured by the message catalog system by counting the number of times said users of each said participating site have, by selecting each said sponsored message through a gesture appropriate to said user device, chosen to link or otherwise be directed from said sponsored message to said additional information from said sponsor of said sponsored message.

9. The method of claim 1 wherein said message catalog system records all said expressions of interest in said central catalog and ranks said sponsored messages on each said site or service according to said interest expressed in each said sponsored message solely by said users of the same said site or service.

* * * * *